(12) United States Patent
Casagrande

(10) Patent No.: US 11,420,697 B2
(45) Date of Patent: Aug. 23, 2022

(54) SITTING STRUCTURE FOR CHILDREN, APPLICABLE TO A BICYCLE

(71) Applicant: Gilberto Casagrande, Godega di Sant'Urbano (IT)

(72) Inventor: Gilberto Casagrande, Godega di Sant'Urbano (IT)

( * ) Notice: Subject to any disclaimer, the term of this patent is extended or adjusted under 35 U.S.C. 154(b) by 283 days.

(21) Appl. No.: 16/634,380

(22) PCT Filed: Jul. 25, 2018

(86) PCT No.: PCT/IB2018/055552
§ 371 (c)(1),
(2) Date: Jan. 27, 2020

(87) PCT Pub. No.: WO2019/021212
PCT Pub. Date: Jan. 31, 2019

(65) Prior Publication Data
US 2021/0094643 A1    Apr. 1, 2021

(30) Foreign Application Priority Data
Jul. 26, 2017   (IT) .......................... 102017000085468

(51) Int. Cl.
*B62J 1/16*    (2006.01)

(52) U.S. Cl.
CPC ....................... *B62J 1/16* (2013.01)

(58) Field of Classification Search
CPC .................. B62J 1/16; B60N 2/2863
See application file for complete search history.

(56) References Cited

U.S. PATENT DOCUMENTS

| | | | | |
|---|---|---|---|---|
| 3,802,598 A | * | 4/1974 | Burger | B62J 1/14 280/202 |
| 4,964,551 A | * | 10/1990 | O'Donovan | B62J 1/16 224/415 |
| 5,411,190 A | * | 5/1995 | Kortenbrede | B62J 7/04 224/422 |
| 5,542,587 A | | 8/1996 | Broz et al. | |
| 5,622,374 A | * | 4/1997 | Rudeen | B62J 1/16 224/415 |

FOREIGN PATENT DOCUMENTS

| | | | | |
|---|---|---|---|---|
| CA | 2219077 A1 | * | 7/1998 | ............. B62J 1/02 |
| CN | 1424218 A | | 6/2003 | |
| DE | 29818047 U1 | | 10/1999 | |
| DE | 202010016094 | * | 2/2011 | ............. B62J 7/04 |

OTHER PUBLICATIONS

International Search Report and Written Opinion, dated Sep. 21, 2018, from corresponding PCT application No. PCT/IB2018/055552.

\* cited by examiner

*Primary Examiner* — Milton Nelson, Jr.
(74) *Attorney, Agent, or Firm* — Nixon & Vanderhye

(57) ABSTRACT

Disclosed is a sitting structure including a child seat and fixable to a bicycle for adults in such a way as to guarantee safety and comfort for the child placed on the child seat and the adult who drives the bicycle.

15 Claims, 1 Drawing Sheet

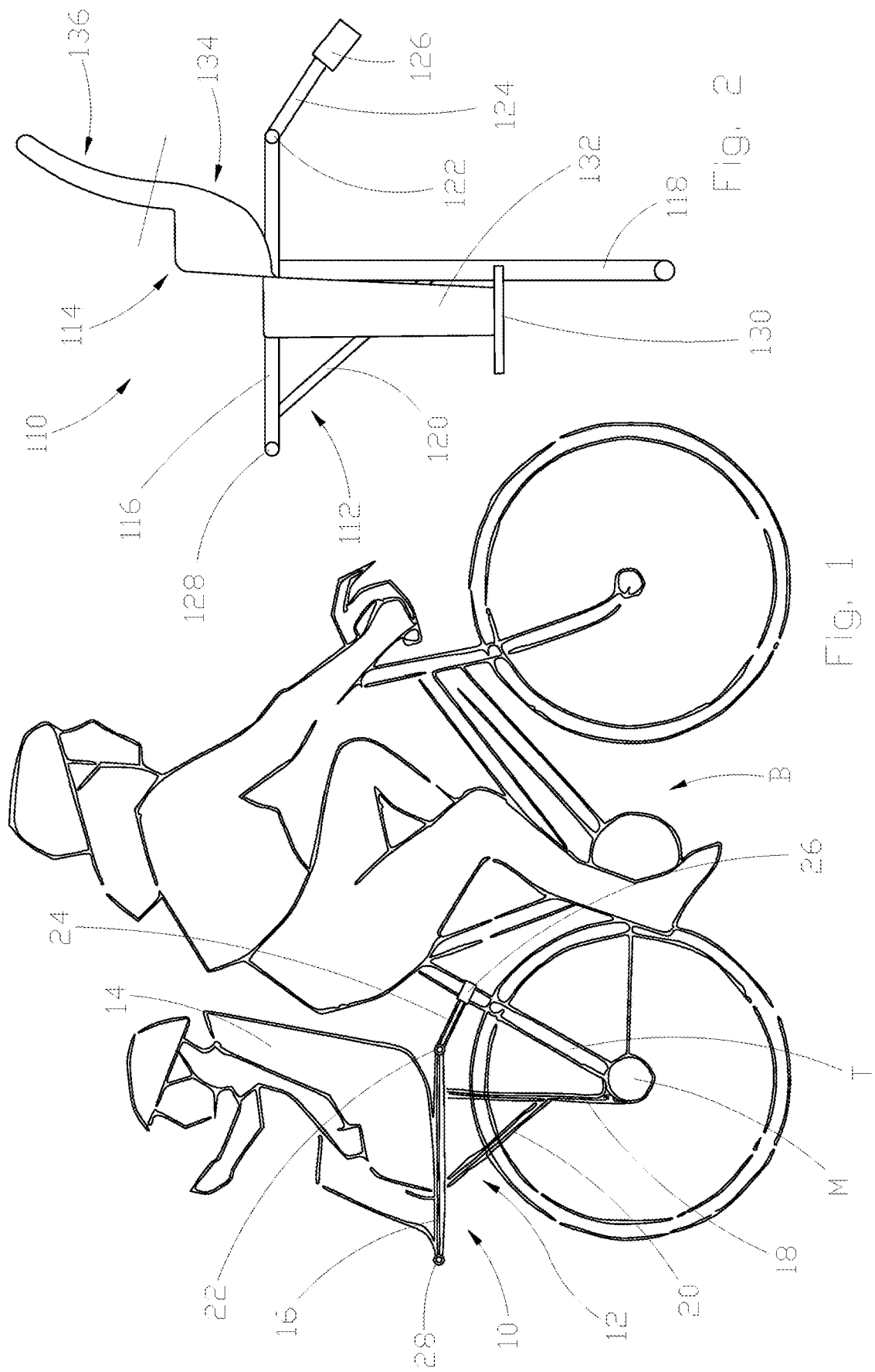

SITTING STRUCTURE FOR CHILDREN, APPLICABLE TO A BICYCLE

BACKGROUND OF THE INVENTION

Field of the Invention

The present invention refers, in general, to a sitting structure for children, applicable to a bicycle. More particularly, the present invention refers to a sitting structure comprising a child seat and fixable to a bicycle for adults in such a way as to guarantee safety and comfort for the child placed on the child seat and the adult who drives the bicycle.

Description of the Related Art

As is known, when a child has to be carried on a bicycle for adults, it is necessary to use suitable child seats to be fixed to the bicycle itself.

The child seats applicable to the bicycle for adults are usually of two types.

The child seats for rather small children aged about eight months to eighteen months are made according to a first typology and are mounted on the bicycle handlebar so that the child accommodated on the child seat is facing the front part of the bicycle and can, therefore, see forward without any obstacle.

A second typology of child seats, suitable for children over eighteen months old provides for fixing the child seat to the rear part of the bicycle, and precisely to the frame on the crosspiece that goes from the saddle to the central movement system to which the pedals are pivoted.

Even according to this second typology, the child sitting on the child seat is facing the front part of the bicycle but in this case, the child is sitting behind the adult who drives the bicycle so that it is not possible for the child to see forward and this position is not very stimulating for the child who is forced to turn his head sideways to see what is around him and places himself in an uncomfortable position.

In order to avoid said problems, child seats have been conceived to be applied to the rear part of the bicycle in such a way that the entire body of the child is arranged laterally to the bicycle or even arranged toward the rear part of the bicycle.

However, in these cases there may be another problem, namely that the child needs to see the adult who is accompanying him and needs to feel secure and not abandoned.

SUMMARY OF THE INVENTION

An object of the invention is to overcome the above-mentioned drawbacks and others by making a sitting structure for children, fixable to a bicycle for adults, ensuring an excellent view for the child accommodated on the seat.

Another object of the invention is to provide a sitting structure for children, fixable to bicycles for adults, meeting the needs of the child, changing over time, in terms of safety and comfort.

A further object of the invention is to provide a sitting structure for children, fixable to bicycles for adults, ensuring a good comfort even to the adult who drives the bicycle to which the sitting structure in question is fixed.

The above-mentioned objects and still others are reached according to the invention through a sitting structure for children, applicable to a bicycle for adults and comprising a rear hub and a crosspiece connecting the hub to the bicycle saddle.

The sitting structure according to the invention comprises a frame which is fixed in a removable way to the rear hub, and a child seat which is fixed rigidly to the frame and faces the rear of the bicycle.

The said sitting structure according to the invention is characterized by the fact that the frame comprises a base structure to which an arm is pivoted by means of a first hinge, a clamping system being fixed to the free end of the arm for a removable coupling of the arm to the crosspiece of the bicycle.

Through this configuration, in particular through the possible rotation of the arm with respect to the base structure of the frame, the sitting structure according to the invention can be connected to any bicycles of different models and sizes.

Besides, the sitting structure according to the invention allows to have the child seat facing the back of the bicycle so as to offer full view to the child.

Advantageously, a second hinge may be fixed to the base structure at the opposite end with respect to the first hinge and the arm may be removable from the first hinge so as to be fixed to the second hinge.

In this way, the sitting structure can be coupled to the bicycle so that the child seat can be turned, alternately, towards the rear part or the front part of the bicycle.

In order to allow the sitting structure to be removably fixed to the bicycle, a bracket may be fixed below the base structure and develops perpendicularly to the base structure and may be coupled to the hub.

In order to reinforce the frame, the frame itself may comprise a bar, the bar ends being welded to the bracket and to the base structure, respectively.

Advantageously, in order to ensure a comfortable sitting of the child and the adult driving the bicycle, the child seat may comprise a backrest including a first lower cavity on which the child's back can rest, and a second upper cavity where the back of the adult driving the bicycle can rest.

In order to ensure the safety of the child, the child seat may comprise supports for the child's feet.

In addition, the child seat may comprise side walls preventing the child's legs from inserting dangerously between the spokes of the rear wheel of the bicycle.

BRIEF DESCRIPTION OF THE DRAWINGS

Further features and details of the invention will be better understood from the following specification which is provided by way of a non-restricting example as well as from the annexed drawing, wherein:

FIG. 1 is a schematic side view of a sitting structure for children, fixed to a bicycle, according to a first embodiment of the invention;

FIG. 2 is a schematic side view of a sitting structure, according to a second embodiment of the invention.

DESCRIPTION OF THE PREFERRED EMBODIMENTS

With reference to the annexed FIG. 1, reference number 10 denotes a sitting structure with a child seat fixed to a bicycle B for adults.

The sitting structure 10 includes a frame 12 and a child seat 14, fixed to the frame 12 (112 in FIG. 2) rigidly.

In particular, the frame 12 includes a base structure 16 to which the child seat 14 is fixed and is facing the back of the bicycle, as it appears from FIG. 1.

A bracket 18 is fixed below the base structure 16 and develops perpendicularly to the base structure 16.

Besides, the bracket 18 has a lower end which is fixed by means of a connection device to the frame of the bicycle B in correspondence of the rear hub M.

The coupling of the bracket 18 to the base structure 16 is ensured also by an oblique bar 20 (120 in FIG. 2), the ends of the bar being welded to the bracket 18 and the base structure 16, respectively.

A first hinge 22 (122 in FIG. 2) is fixed to the front end of the base structure 16 and connects the base structure to an arm 24 (124 in FIG. 2) so that it is possible to vary the inclination of it.

The same arm 24 is fixed in a removable way to the crosspiece T of the bicycle B. The crosspiece T extends from the rear hub M to the saddle. The releasable fixing of the arm 24 to the crosspiece T is obtained by means of a clamping system 26 (126 in FIG. 2).

A second hinge 28 is fixed to the rear end of the base structure 16, the arm 24 being fixable, in case, to said second hinge.

In fact, as shown in FIG. 1, the child sitting on the child seat 14 is facing the rear part of the bicycle and, therefore, can see all around without having any obstacle in front of him.

In case the child needs to perceive the presence of the adult who is driving the bicycle, the sitting structure 10 can be removed from the bicycle B by releasing the connecting device of the bracket 18 from the hub M and releasing the clamping system 26 from the crosspiece T of the bicycle B.

Once the arm 24 has been removed from the first hinge 22, the arm 24 is fixed to the second hinge 28 and then, the entire sitting structure 10 is rotated 180 degrees and is mounted on the bicycle B by means of the connecting device and the clamping system 26.

In this way, the child seat 14 is now turned toward the front part of the bicycle and the child is in contact, even visually, with the adult who is driving the bicycle B.

Besides, the possibility of rotating the arm 24 with respect to the base structure 16 allows to fix the sitting structure 10 to every bicycle for adults, regardless of the size of the bicycle B and the inclination of the crosspiece T.

According to a variant of the invention as shown in FIG. 2, a sitting structure 110 for children, fixable to a bicycle for adults, comprises a child seat 114, fixed to a frame 112, which corresponds to the frame 12 previously described for the sitting structure 10, and includes corresponding elements denoted by the same reference numbers increased by a hundred.

However, unlike that, in addition to feet supports 130 and side walls 132 preventing the legs of the child from inserting dangerously among the spokes of the rear wheel of the bicycle, the child seat 114 comprises also a particularly shaped back.

In fact, the back of the child seat 114 includes a first lower cavity 134 on which the back of the child can comfortably rest, as well as a second upper cavity 136 on which the back of the adult, who drives the bicycle on which the sitting structure 110 is fixed, can rest.

A technician of this sector can make changes or variants that are to be considered as included in the scope of protection of the present invention.

For example, the bracket for fixing the base structure to the wheel hub of the bicycle can be double so as to form a kind of fork astride of the rear wheel.

Besides, the arm that connects the base structure 16 to the crosspiece T of the bicycle B can be telescopic.

The invention claimed is:

1. A sitting structure (10; 110) for children applicable to a bicycle (B) for adults, the bicycle (B) comprising a rear hub (M) and a crosspiece (T) connecting the hub (M) to a bicycle saddle, said sitting structure (10; 110) comprising:
   a frame (12; 112); and
   a child seat (14; 114) fixed rigidly to the frame (12; 112) and, when mounted on the bicycle (b), facing a rear of the bicycle,
   the frame (12; 112) being fixable in a removable way to the rear hub (M),
   wherein the frame (12; 112) comprises a base structure (16; 116) to which an arm (24; 124) is pivoted by means of a first hinge (22; 122), and a clamping system (26; 126) fixed to a free end of the arm (24; 124) for a removable coupling of the arm (24; 124) to the crosspiece (T) of the bicycle (B),
   wherein a second hinge (28; 128) is fixed to the base structure (16; 116) at an opposite end with respect to the first hinge (22; 122) and
   wherein the arm (24; 124) is removable from the first hinge (22; 122), so as to be fixed to the second hinge (28; 128).

2. The sitting structure (110) according to claim 1, wherein the child seat (114) comprises side walls (132) preventing the child's legs from inserting between spokes of a rear wheel of the bicycle (B).

3. The sitting structure (10; 110) according to claim 1, wherein a bracket (18; 118) is fixed below the base structure (16; 116) that develops perpendicularly to the base structure (16; 116) and can be coupled to the hub (M).

4. The sitting structure (10; 110) according to claim 3, wherein the frame (12; 112) further comprises a bar (20; 120) whose ends are welded to the bracket (18; 118) and to the base structure (16; 116), respectively.

5. The sitting structure (110) according to claim 4, wherein the child seat (114) comprises supports (130) for the child's feet.

6. The sitting structure (110) according to claim 4, wherein the child seat (114) comprises a backrest including a first lower cavity (134) where the child's back can rest, and a second upper cavity (136) where the back of the adult driving the bicycle can rest (B).

7. The sitting structure (110) according to claim 6, wherein the child seat (114) comprises supports (130) for the child's feet.

8. The sitting structure (110) according to claim 7, wherein the child seat (114) comprises side walls (132) preventing the child's legs from inserting between spokes of a rear wheel of the bicycle (B).

9. A sitting structure (10; 110) for children in combination with a bicycle (B) for adults,
   the bicycle comprising a rear hub (M) and a crosspiece (T) connecting the hub (M) to a bicycle saddle, and
   said sitting structure (10; 110) comprising:
   a frame (12; 112); and
   a child seat (14; 114) fixed rigidly to the frame (12; 112) and facing a rear of the bicycle,
   the frame (12; 112) being fixed in a removable way to the rear hub (M),
   wherein the frame (12; 112) comprises a base structure (16; 116) to which an arm (24; 124) is pivoted by means of a first hinge (22; 122), and a clamping system (26; 126) fixed to a free end of the arm (24; 124) for a removable coupling of the arm (24; 124) to the crosspiece (T) of the bicycle (B), wherein a second hinge (28; 128) is fixed to the base structure (16; 116) at an opposite end with respect to the first hinge (22; 122), and wherein the arm (24; 124) is removable from the first hinge (22; 122), so as to be fixed to the second hinge (28; 128).

10. The combination of claim 9, wherein the child seat (114) comprises side walls (132) preventing the child's legs from inserting between spokes of a rear wheel of the bicycle (B).

11. The combination of claim 9, wherein the bracket (18; 118) is fixed below the base structure (16; 116) that develops perpendicularly to the base structure (16; 116) and can be coupled to the hub (M).

12. The combination of claim 11, wherein the frame (12; 112) further comprises a bar (20; 120) whose ends are welded to the bracket (18; 118) and to the base structure (16; 116), respectively.

13. The combination of claim 12, wherein the child seat (114) comprises a backrest including a first lower cavity (134) where the child's back can rest, and a second upper cavity (136) where the back of the adult driving the bicycle can rest (B).

14. The combination of claim 13, wherein the child seat (114) comprises supports (130) for the child's feet.

15. The combination of claim 14, wherein the child seat (114) comprises side walls (132) preventing the child's legs from inserting between spokes of a rear wheel of the bicycle (B).

\* \* \* \* \*